UNITED STATES PATENT OFFICE.

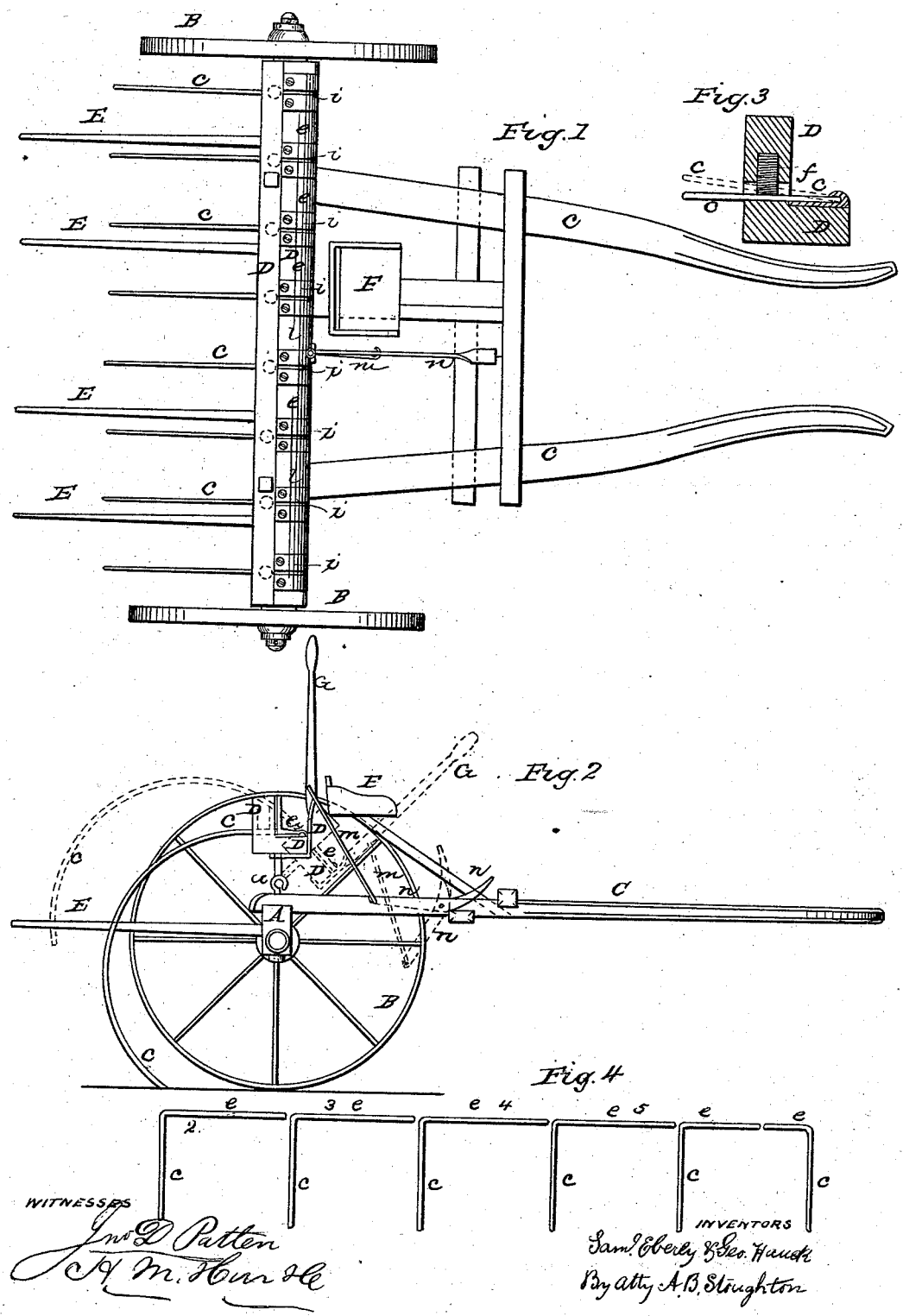

SAMUEL EBERLY AND GEORGE HAUCK, OF MECHANICSBURG, PA.

IMPROVEMENT IN HORSE-RAKES.

Specification forming part of Letters Patent No. 66,314, dated July 2, 1867.

*To all whom it may concern:*

Be it known that we, SAMUEL EBERLY and GEORGE HAUCK, of Mechanicsburg, in the county of Cumberland and State of Pennsylvania, have invented certain new and useful Improvements in Horse Hay-Rakes; and we do hereby declare the following to be a full, clear, and exact description of the same, reference being had to the accompanying drawings, making a part of this specification, in which—

Figure 1 represents a top plan of the machine. Fig. 2 represents a side elevation. Fig. 3 represents a section through the hinged head-piece, in which the spring and yielding rake-teeth are set and work. Fig. 4 represents the manner of constructing the rake-teeth, with the shank on which they turn independent of the rake-head formed thereon.

Similar letters of reference, where they occur in the several separate figures, denote like parts in all the drawings.

Our invention consists in the manner in which we attach the rake-teeth to the hinged rake-head, so that said teeth may have a yielding movement independent of their joint movement with the rake-head.

To enable others skilled in the art to make and use our invention, we will proceed to describe the same with reference to the drawings.

A represents the axles, B B the wheels, and C the shafts, which may be constructed in any of the usual well-known ways. Over the axle A is hinged, as at *a*, the rake-head D, which is of an L-shaped or angular form, through the vertical portion of which pass the rake-teeth *c*, so that their shanks *e* may lie upon the shelf or horizontal portion, as seen more particularly in Fig. 3. In the rake-head D is placed a series of coiled or rubber springs, *f*, one for each rake-tooth, against which the tooth presses, and allows it to yield to any undue strain upon it, as when striking against or passing over any obstruction or inequality in the ground. A series of bearings or boxes, *i*, is arranged on the shelf portion of the rake-head D for the shanks *e* of the rake-teeth to rest or turn in, as the case may be. This shank *e*, which is turned at right angles to and on one side only of the line of the body of the tooth, has each of them a bearing in one or two of the said boxes *i*, viz., in its own box, and may extend to the one next adjacent thereto, the shank being long enough to have this bearing or support in parts of the two boxes, as illustrated in Fig. 4. The shank 2, as therein shown, is supported in its own box, and partly in the box of the shank 3, and the shank 3 is supported in its own box and partly in the box 4, and so on, thus giving to each tooth a shank and bearing long enough to firmly sustain it against the strain that comes upon it, and yet leave each tooth free to yield to any and all strain that may come upon it individually, while the spring *f* is strong enough to hold it to its work and from yielding so freely as to pass over the hay without raking it up into the windrow.

In rear of the axle A is a series of projecting fingers, E, to hold back the hay and prevent it from rolling or rising up with the rake-teeth.

On the shafts or shaft-frame is arranged a seat, F, for the driver or operator of the machine, and in close proximity to the seat, and fastened to the rake-head D, there is a hand-lever, G, which is connected by a rod or link, *m*, to a pivoted foot-lever, *n*, so that the driver or conductor, from his seat, by placing his foot upon the forward end of the lever *n*, holds the rake in its working position, and by removing his foot, and drawing the hand-lever forward and downward, raises up the rake-teeth to release the hay.

The rake-teeth, and the parts working in connection with them, are shown by black lines, in their working or raking positions, in Fig. 2, and by red lines in their tripped or delivering position in the same figure.

Instead of the shanks *e* extending to and having bearings in two boxes, the boxes may be long enough to receive the entire shank within itself, it being a mere question of how long the shank should be, or how long the box should be. What we propose is to make the shanks long enough to have a suitable bearing, whether it be in one box or in two of them. The use of the two adjacent boxes for each shank answers a good purpose, and it is obvious that we can use but one box to each shank if we make them of suitable length.

Having thus fully described our invention, what we claim therein as new, and desire to secure by Letters Patent, is—

Connecting the rake-teeth to the swinging rake-head by the combined use of the shanks $e$ and their extended bearings in the boxes $i$, and the reactionary springs $f$, constructed, arranged, and operating substantially in the manner and for the purpose described and represented.

SAMUEL EBERLY.
GEO. HAUCK.

Witnesses:
F. WONDERLY,
JOSEPH LEAS.